United States Patent
Lee et al.

(10) Patent No.: US 10,200,221 B2
(45) Date of Patent: Feb. 5, 2019

(54) METHOD AND APPARATUS FOR SELECTING CODEBOOK INDEX

(71) Applicant: LG ELECTRONICS INC., Seoul (KR)

(72) Inventors: Kyuin Lee, Seoul (KR); Jaewook Song, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 44 days.

(21) Appl. No.: 15/395,499

(22) Filed: Dec. 30, 2016

(65) Prior Publication Data

US 2018/0115444 A1  Apr. 26, 2018

(30) Foreign Application Priority Data

Oct. 25, 2016 (KR) .................. 10-2016-0139186

(51) Int. Cl.

| | |
|---|---|
| *H04W 4/00* | (2018.01) |
| *H04L 25/03* | (2006.01) |
| *H04B 17/318* | (2015.01) |
| *H04B 7/0413* | (2017.01) |
| *H04L 5/00* | (2006.01) |
| *H04L 27/26* | (2006.01) |
| *H04W 52/36* | (2009.01) |
| *H04W 52/42* | (2009.01) |

(Continued)

(52) U.S. Cl.
CPC ..... *H04L 25/03904* (2013.01); *H04B 7/0413* (2013.01); *H04B 7/0456* (2013.01); *H04B 7/10* (2013.01); *H04B 17/318* (2015.01); *H04L 5/0007* (2013.01); *H04L 27/2634* (2013.01); *H04W 52/367* (2013.01); *H04W 52/42* (2013.01); *H04W 88/02* (2013.01); *H04W 88/08* (2013.01)

(58) Field of Classification Search
CPC ........... H04L 25/03904; H04L 5/0007; H04W 88/02; H04W 88/08
See application file for complete search history.

(56) References Cited

U.S. PATENT DOCUMENTS

2013/0201912 A1* 8/2013 Sheng ................. H04B 7/0413
370/328

OTHER PUBLICATIONS

3rd Generation Partnership Project, "Technical Specification Group Radio Access Network; Evolved Universal Terrestrial Radio Access (E-UTRA); Physical layer procedures (Release 14)", 3GPP TS 36.213 V14.0.0, Sep. 2016, 406 pages.

* cited by examiner

*Primary Examiner* — Maharishi V Khirodhar
(74) *Attorney, Agent, or Firm* — Lee Hong Degerman Kang Waimey

(57) ABSTRACT

Provided are a method for a user equipment to select a codebook index in a wireless communication system and an apparatus supporting the method. The method performed by the user equipment comprises performing zero padding for a first vector, wherein the first vector represents a channel state measured by a receive antenna for a first transmit antenna; performing IFFT for a second vector, wherein the second vector is obtained by performing the zero padding for the first vector; performing receive antenna combining for a third vector, wherein the third vector is obtained by performing IFFT for the second vector; and detecting a maximum element from a fourth vector, wherein the fourth vector is obtained by performing the receive antenna combining for the third vector.

13 Claims, 12 Drawing Sheets

(51) Int. Cl.
*H04B 7/0456* (2017.01)
*H04B 7/10* (2017.01)
*H04W 88/02* (2009.01)
*H04W 88/08* (2009.01)

FIG. 5
(Prior Art)
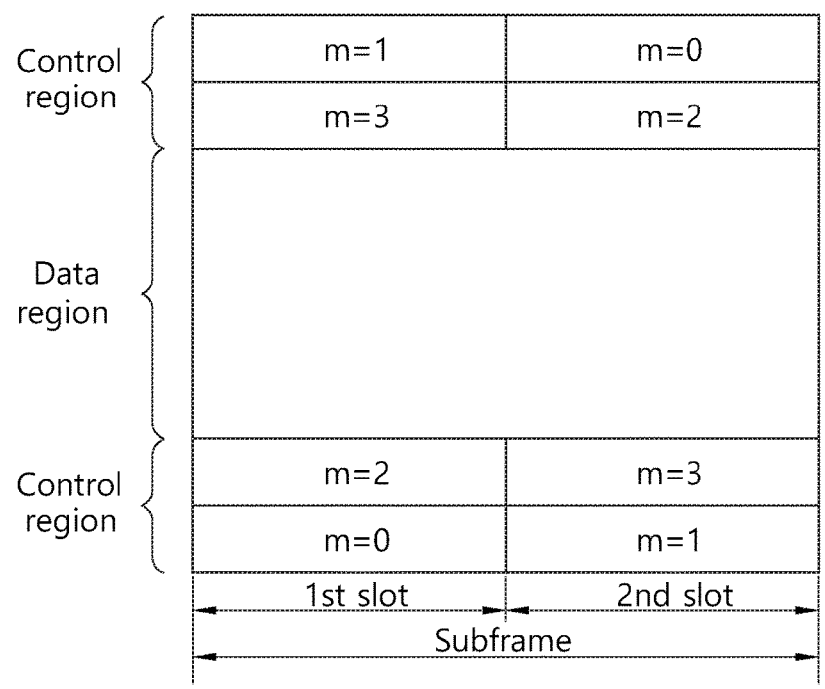
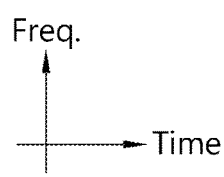

METHOD AND APPARATUS FOR SELECTING CODEBOOK INDEX

CROSS-REFERENCE TO RELATED APPLICATIONS

Pursuant to 35 U.S.C. § 119(a), this application claims the benefit of earlier filing date and right of priority to Korean Patent Application No. 10-2016-0139186, filed on Oct. 25, 2016, the contents of which are hereby incorporated by reference herein in its entirety.

BACKGROUND OF THE INVENTION

Field of the Invention

The present invention relates to a wireless communication system and more particularly a method for a user equipment to select a codebook index in a wireless communication system and an apparatus supporting the method.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

Recently, Multiple Input Multiple Output (MIMO) systems are getting much attention in an effort to maximize performance of wireless communication systems and communication capacity. Evolved from the conventional method of using a single transmit antenna and a single receive antenna, MIMO technology may improve efficiency of transmitting and receiving data by adopting multiple transmit antennas and multiple receive antennas. A MIMO system is also called a multiple antenna system. MIMO technology relies on integration of data segments received from multiple antennas to get a single, whole message instead of relying on a single antenna path. As a result, data transmission speed can be increased within a specific range, or system operation scope can be increased with respect to a specific data transmission speed.

Elements of MIMO technology include transmit diversity, spatial multiplexing, and beamforming. Transmit diversity refers to the technology for improving transmission reliability by transmitting the same data through multiple transmit antennas. Spatial multiplexing refers to the technology for transmitting high speed data without increasing system bandwidth by transmitting different data simultaneously through multiple transmit antennas. Beamforming is used to increase SINR (Signal to Interference plus Noise Ratio) of a signal by applying channel-dependent weights in a multiple antenna system. At this time, weights may be expressed in terms of a weight vector or weight matrix, which is called a precoding vector or precoding matrix respectively.

Spatial multiplexing may be further divided into spatial multiplexing for a single user and spatial multiplexing for multiple users. Spatial multiplexing for a single user is also called SU-MIMO (Single User MIMO) while spatial multiplexing for multiple users is called SDMA (Spatial Division Multiple Access) or MU-MIMO (Multi-User MIMO). Capacity of a MIMO channel increases in proportion to the number of antennas. A MIMO channel may be decomposed into independent channels. Given that the number of transmit antennas is Nt, and the number of receive antennas is Nr, the number of independent channels Ni becomes $Ni \leq \min\{Nt, Nr\}$. Each independent channel may be regarded as a spatial layer. A rank represents the number of non-zero eigenvalues of the MIMO channel matrix and may be defined as the number of spatial streams that may be multiplexed.

MIMO technology uses a codebook-based precoding technique. The codebook-based precoding technique has been devised to transmit a precoding matrix indicator (PMI) by selecting a precoding matrix most similar to the MIMO channel among predetermined precoding matrices, which may be used to reduce overhead due to recursive data. A codebook comprises a codebook set which may represent spatial channels. To increase transmission rate of data, the number of antennas has to be increased, but the codebook has to be prepared with a larger number of codebook sets in proportion to the number of antennas. Because of the increase of codebook sets in proportion to the number of antennas, not only the overhead due to recursive data is increased but also designing a codebook becomes difficult.

SUMMARY OF THE INVENTION

In the CL-SM scheme, a user equipment has to search all the available codebooks to find a codebook index with which the maximum throughput may be achieved within a predetermined codebook. However, calculation of all the possible codebooks over all of the layers available may be a large computational burden on the user equipment. Therefore, it is necessary to propose a method for reducing computational complexity in the codebook search.

In one embodiment of the present invention, a method for a user equipment to select a codebook index in a wireless communication system is provided. The method performed by the user equipment comprises performing zero padding for a first vector, wherein the first vector represents a channel state measured by a receive antenna for a first transmit antenna; performing IFFT for a second vector, wherein the second vector is obtained by performing the zero padding for the first vector; performing receive antenna combining for a third vector, wherein the third vector is obtained by performing the IFFT for the second vector; and detecting a maximum element from a fourth vector, wherein the fourth vector is obtained by performing receive antenna combining for the third vector.

The method performed by the user equipment may further comprise selecting the codebook index on the basis of the maximum index detected.

The receive antenna combining may correspond to calculating the sum of magnitudes of one or more of the elements of the third vector.

The method performed by the user equipment may further comprise performing the zero padding for a fifth vector, wherein the fifth vector represents a channel state measured by the receive antenna for a second transmit antenna; performing the IFFT for a sixth vector, wherein the sixth vector is obtained by performing the zero padding for the fifth vector; performing the receive antenna combining for a seventh vector, wherein the seventh vector is obtained by performing the IFFT for the sixth vector; and detecting a maximum element of an eighth vector, wherein the eighth vector is obtained by performing receive antenna combining for the seventh vector.

The first transmit antenna and the second transmit antenna may be cross-polarization antennas.

The method performed by the user equipment may further comprise comparing the maximum element detected from the fourth vector with the maximum element detected from the eighth vector.

The method performed by the user equipment may further comprise selecting an index of the larger of the maximum element detected from the fourth vector and the maximum element detected from the eighth vector.

The method performed by the user equipment may further comprise calculating a phase between elements of the third vector corresponding to the selected index and elements of the seventh vector.

The method performed by the user equipment may further comprise selecting the codebook index on the basis of the calculated phase.

In another embodiment of the present invention, a user equipment for selecting a codebook index in a wireless communication system is provided. The user equipment comprises a memory; a transceiver, and a processor connecting the memory and the transceiver to each other, wherein the processor is configured to perform zero padding for a first vector, perform IFFT for a second vector, perform receive antenna combining for a third vector, and detect a maximum element from a fourth vector, wherein the first vector represents a channel state measured by a receive antenna for a first transmit antenna, the second vector is obtained by performing the zero padding for the first vector, the third vector is obtained by performing the IFFT for the second vector, and the fourth vector is obtained by performing the receive antenna combining for the third vector.

Computational complexity in codebook search may be reduced.

BRIEF DESCRIPTION OF THE DRAWINGS

FIG. 5 shows a structure of an uplink subframe.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
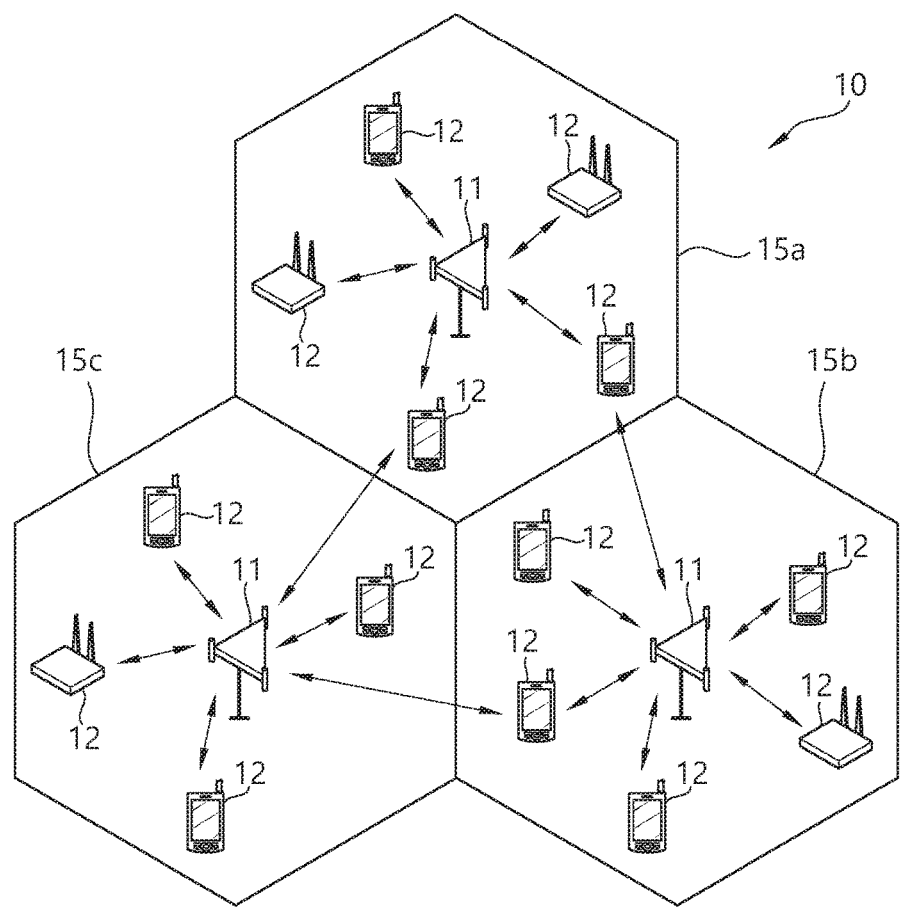
FIG. 1 shows a wireless communication system.

FIG. 1 shows a wireless communication system.

Referring to FIG. 1, the wireless communication system 10 includes one or more base stations (BSs) 11. The BSs 11 provide communication services to respective geographical areas (in general called 'cells') 15 a, 15 b, and 15 c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
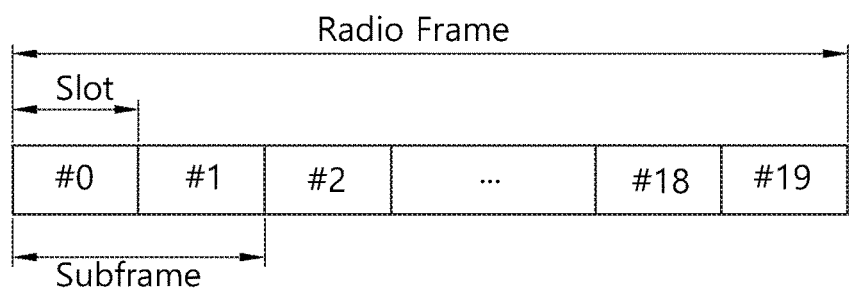
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called atransmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
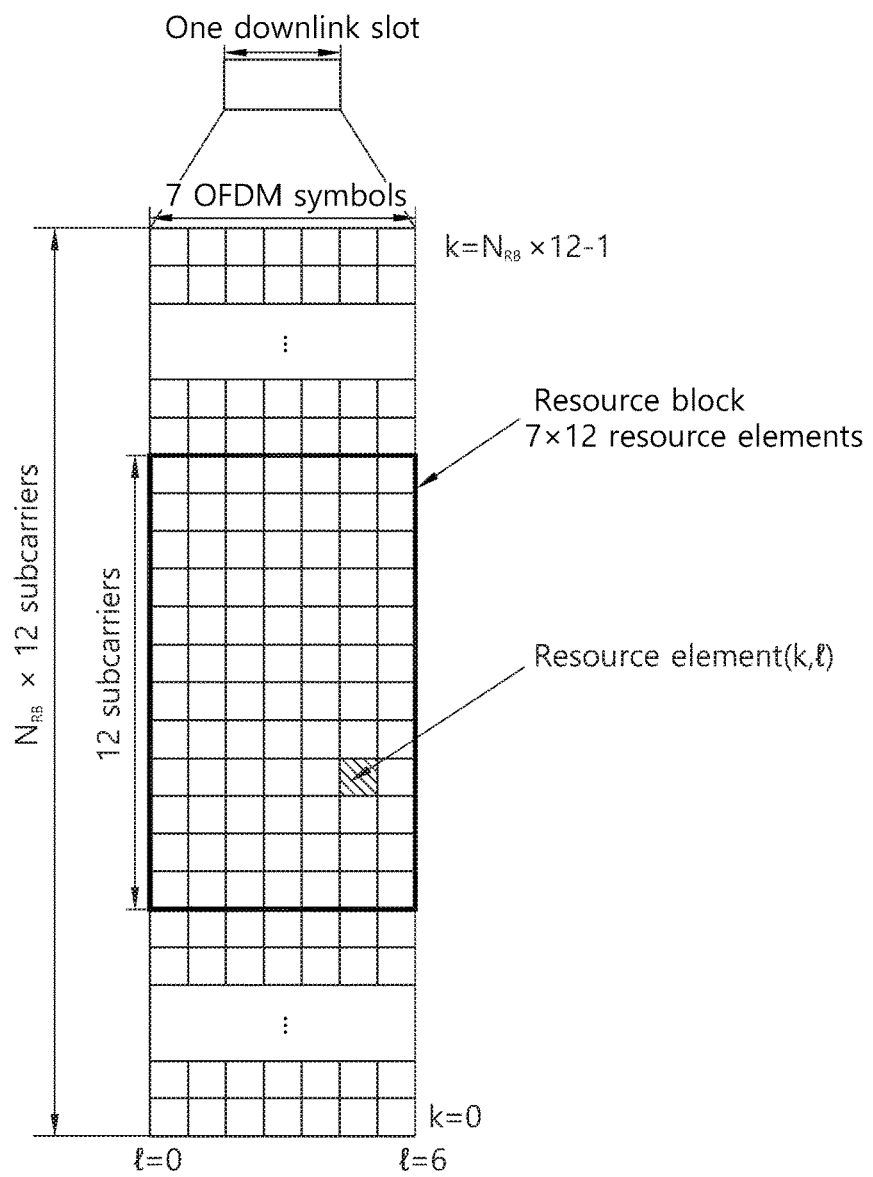
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , NRB×12-1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
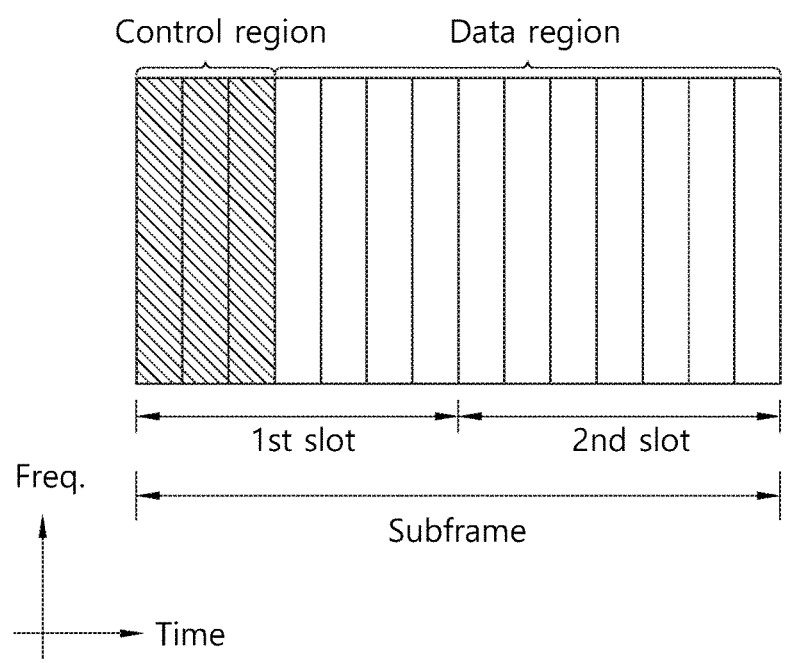
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to downlink control information (DCI) to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

In What Follows, Descriptions About A Mimo System Will Be Given.

In the LTE system, MIMO methods may be divided largely into T×D (Transmit Diversity), OL-SM (Open Loop Spatial Multiplexing), and CL-SM (Closed Loop Spatial Multiplexing) approaches. In a T×D MIMO system, a single stream is transmitted to maximize diversity gain without channel information of a UE. In an OL-SM MIMO system, multi-streams are transmitted in a randomized way as possibly as may be without channel information of a UE. And in a CL-SM MIMO system, a UE selects a PMI (Precoding Matrix Indicator) by using current channel information and exhibits the maximum reception performance by using the selected PMI information. The PMI may be selected from a codebook predefined between a base station and a UE.

Figure 6A:
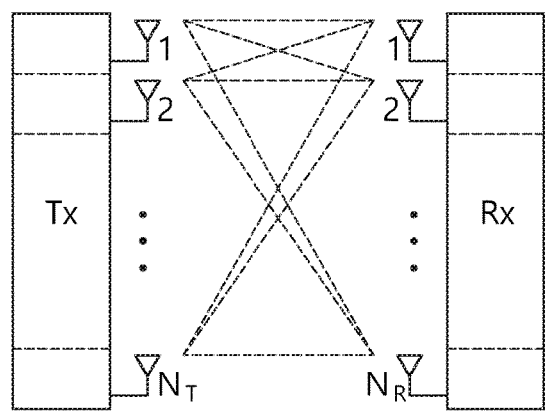
FIGS. 6A and 6B show a MIMO communication system.
Figure 6B:
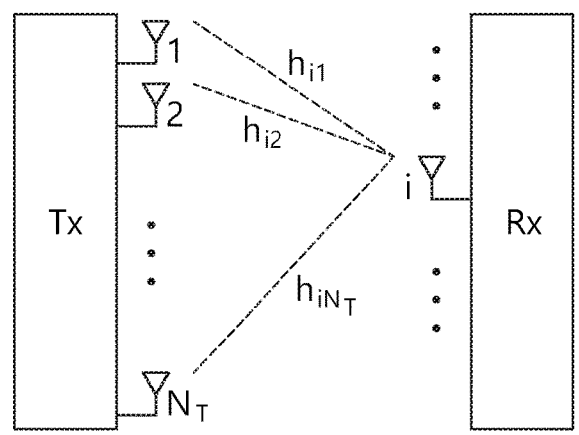

FIGS. 6A and 6B show a MIMO communication system

With reference to FIG. 6A, in theory, if the number of transmit antennas is increased to $N_T$, and the number of receive antennas is increased to $N_R$ simultaneously, channel transmission capacity is increased in proportion to the number of antennas differently from the case in which multiple antennas are employed only in a transmitter or a receiver. Therefore, it becomes possible to improve transmission rate and frequency efficiency significantly. In theory, the transmission rate due to increase of channel transmission capacity may be increased by the maximum transmission rate (Ro) in the case of using one antenna multiplied by the increase rate (Ri) of Eq. 1 below.

$$R_i = \min(N_T, N_R) \quad [\text{Eq. 1}]$$

For example, a MIMO communication system employing four transmit antennas and four receive antennas may achieve a theoretical improvement of the transmission rate four times the transmission rate of a single antenna system.

To describe a communication method used in a multiple antenna system more specifically, the aforementioned example may be modeled mathematically. Suppose $N_T$ transmit antennas and $N_R$ receive antennas are given. In the case of $N_T$ transmit antennas, the maximum number of information that may be transmitted is $N_T$; therefore, transmission information may be expressed in the form of a vector as shown in Eq. 2.

$$S = [s_1, s_2, \ldots, s_{N_T}]^T \quad [\text{Eq. 2}]$$

Meanwhile, transmission power in each transmission information $(s_1, s_2, \ldots, s_N)$ may be set differently from each other, and if the transmission power is denoted as $P_1, P_2, \ldots P_N$, transmission information ($\hat{S}$) with adjusted transmission power may be expressed in a vector form as shown in Eq. 3.

$$\hat{s} = [\hat{s}_1, \hat{s}_2, \ldots, \hat{s}_{N_T}]^T = [Ps_1, Ps_2, \ldots, Ps_{N_T}]^T \quad [\text{Eq. 3}]$$

Also, transmission information with adjusted transmission power may be expressed in a diagonal matrix comprising transmission power as shown in Eq. 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad [\text{Eq. 4}]$$

Meanwhile, suppose a weight matrix W is applied to the transmission information with adjusted transmission power to form $N_T$ actual transmission signals $(x_1, x_2, \ldots, x_{NT})$. At this time, a weight matrix is used to distribute transmission information appropriately across the respective antennas according to transmission channel states. The transmission signal may be expressed as shown in Eq. 5 by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad [\text{Eq. 5}]$$

$W_{ij}$ represents a weight between the i-th transmission antenna and the j-th information. W is called a weight matrix or precoding matrix.

In the case of NR receive antennas $(y_1, y_2, \ldots y_{NR})$, a received signal at each antenna may be expressed in a vector form as shown in Eq. 6.

$$y = [y_1, y_2, \ldots, y_{N_R}]^T \quad [\text{Eq. 6}]$$

Meanwhile, in case a channel is modeled in a multi-antenna communication system, a channel may be identified by a transmit/receive antenna index, and a channel comprising a path from a transmit antenna j to a receive antenna i may be denoted by hij. At this time, the order of index of hij is such that a receive antenna index comes first, followed by the index of a transmit antenna. The channel may be expressed in a vector or matrix form. In what follows, one example of a vector expression will be described with reference to FIG. 6B.

FIG. 6B shows a channel from NT transmit antennas to a receive antenna i. A channel starting from NT transmit antennas to a receive antenna i may be expressed as shown in Eq. 7.

$$h_i^T = [h_{i1}, h_{i2}, \ldots, h_{iN_T}] \quad \text{[Eq. 7]}$$

Also, similar to the matrix expression of Eq. 7, a channel starting from $N_T$ transmit antennas to $N_R$ receive antennas may be expressed as shown in Eq. 8.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Eq. 8]}$$

For an actual channel, an AWGN (Additive White Gaussian Noise) is added to the signal after the channel matrix H; therefore, the AWGN ($n_1, n_2, \ldots, n_{NR}$) added to each of the $N_R$ receive antennas may be expressed in a vector form as shown in Eq. 9.

$$n = [n_1, n_2, \ldots, n_{N_R}]^T \quad \text{[Eq. 9]}$$

A received signal according to the mathematical models given above may be expressed by Eq. 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{12} & h_{12} & \cdots & h_{2N_T} \\ \vdots & & \ddots & \\ h_{i2} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Eq. 10]}$$

$$Hx + n$$

Meanwhile, the numbers of rows and columns of a channel matrix H representing channel conditions are determined by the numbers of transmit and receive antennas. The number of rows in the channel matrix H is the same as the number $N_R$ of receive antennas, and the number of columns is the same as the number $N_T$ of transmit antennas. In other words, the channel matrix H may be represented by a $N_R \times N_T$ matrix. The rank of a matrix is determined by the smaller of the number of independent rows and the number of independent columns. Therefore, the rank of a matrix may not be larger than the number of rows or columns of the corresponding matrix. The rank of the channel matrix H may be expressed by Eq. 11.

$$\text{rank}(H) \leq \min(N_T, N_R) \quad \text{[Eq. 11]}$$

Multiple antenna transmit/receive schemes used for operation of a multiple antenna system include FSTD (Frequency Switched Transmit Diversity), SFBC (Space Frequency Block Code), STBC (Space Time Block Code), CDD (Cyclic Delay Diversity), and TSTD (Time Switched Transmit Diversity). In case the rank is larger than or equal to 2, SM (Spatial Multiplexing), GCDD (Generalized Cyclic Delay Diversity), and S-VAP (Selective Virtual Antenna Permutation) schemes may be used.

The FSTD scheme obtains diversity gain by allocating separate sub-carriers to the respective signals transmitted by multiple antennas. The SFBC scheme obtains not only the diversity gain but also multi-user scheduling gain in the corresponding dimensions by applying selectivity in the spatial and frequency domain efficiently. The STBC scheme applies selectivity in the spatial and time domains. The CDD scheme obtains diversity gain by using a path delay between transmit antennas. The TSTD scheme identifies a signal transmitted by multiple antennas with respect to time. The GCDD scheme applies selectivity in the time and frequency domains. The S-VAP scheme uses a single precoding matrix and comprises MCW (Multi-Codewod) S-VAP which mixes multi-codewords among antennas for spatial diversity or spatial multiplexing; and SCW (Single Codeword) S-VAP which uses a single codeword.

Among the MIMO transmission schemes, the STBC scheme obtains temporal diversity by repeating the same data symbols in a way of supporting orthogonality among the data symbols in the time domain. Similarly, SFBC scheme obtains frequency diversity by repeating the same data symbols in a way of supporting orthogonality among the data symbols in the frequency domain. Equations 12 and 13 describe examples of a time block code used in the STBC scheme and a frequency block code used in the SFBC scheme.

$$\frac{1}{\sqrt{2}} \begin{pmatrix} S_1 & S_2 \\ -S_2^* & S_1^* \end{pmatrix} \quad \text{[Eq. 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Eq. 13]}$$

In Eqs. 12 and 13, Si (i=1, 2, 3, 4) represents a modulated data symbol. Also, a row of the matrix represents an antenna port, and a column of the matrix represents time (in the case of STBC) or frequency (in the case of SFBC).

In What Follows, Codebook-Based Precoding Technique Will Be Described.

To support multi-antenna transmission, precoding may be applied, which distributes transmission information across antennas appropriately according to channel conditions. A codebook-based precoding technique refers to the technique which predetermines a set of precoding matrices for a transmit and a receive node, the receive node (for example, UE) measures channel information from the transmit node (for example, base station) to provide feedback information about the most suitable precoding matrix (namely Precoding Matrix Index (PMI)) to the transmit node, and the transmit node applies appropriate precoding for signal transmission on the basis of the PMI.

Since the codebook-based precoding technique selects an appropriate precoding matrix from a predetermined set of precoding matrices, although it is not always the case that an optimal precoding matrix is applied, this technique may have an advantage of reducing feedback overhead compared with providing optimal precoding information to actual channel information explicitly as feedback information.

Figure 7:
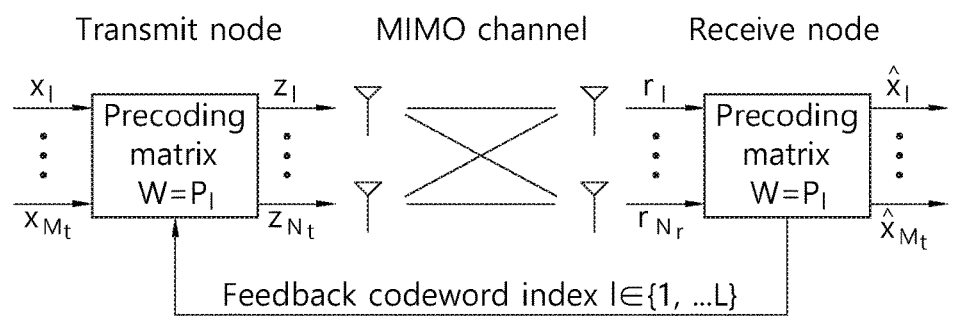
FIG. 7 illustrates a codebook-based precoding.

FIG. 7 illustrates a codebook-based precoding.

If the codebook-based precoding scheme is adopted, a transmit and receive nodes share codebook information which includes a predetermined number of precoding matrices according to the transmission rank, the number of antennas, and the like. In other words, in case feedback information is finite, the precoding-based codebook technique may be used. A receive node may measure channel conditions through a received signal and provide a transmit node with information about a finite number of preferred precoding matrices (namely index of the corresponding precoding matrix) on the basis of the codebook information described above as feedback information.

For example, the receive node may measure a received signal by using ML (Maximum Likelihood) or MMSE (Minimum Mean Square Error) technique and select an optimal precoding matrix. Although FIG. 7 illustrates a situation in which a receive node transmits precoding matrix information to a transmit node for each codeword, but the present invention is not limited to the specific example.

The transmit node which has received feedback information from the receive node may select a specific precoding matrix from a codebook according to the received information. The transmit node which has selected a precoding matrix may perform precoding by multiplying layer signals with the selected precoding matrix, where the number of layer signals corresponds to the transmission rank; the transmit node may transmit a transmission signal for which precoding has been performed to the receive node through multiple antennas. The number of rows in a precoding matrix is the same as the number of antennas, and the number of columns equals the rank of the precoding matrix.

The receive node which has received a signal transmitted after being precoded from the transmit node may reconstruct the received signal by performing the reverse process of the precoding performed at the transmit node. For most cases, a precoding matrix satisfies the unitary matrix (U) conditions such that $U*U^H=I$. Therefore, the inverse of the precoding process may be carried out such that a received signal is multiplied with the Hermit matrix ($P^H$) of the precoding matrix (P) used for precoding at the transmit node.

Table 1 shows a codebook for 1-layer CSI reporting using 4 transmit antennas, and Table 2 shows a codebook for 2-layer CSI reporting using 4 transmit antennas. In Table 1 and 2, a DFT (Discrete Fourier Transform) matrix vector $v'_m$ and cross polarization phase $\varphi_n$, $\varphi'_n$, may be defined as follows. A DFT matrix vector represents the amount of phase change between neighboring antennas, and cross polarization phase represents a phase difference between cross polarization antennas when a transmit antenna is formed to have cross polarization.

$$\varphi_n = e^{j\pi n/2}$$

$$\varphi'_n = e^{j2\pi n/32}$$

$$v'_m = [\,1 \quad e^{j2\pi m/32}\,]^T$$

TABLE 1

| | $i_2$ | | | | | | | |
|---|---|---|---|---|---|---|---|---|
| $i_1$ | 0 | 1 | 2 | 3 | 4 | 5 | 6 | 7 |
| 0-15 | $W^{(1)}_{i_1,0}$ | $W^{(1)}_{i_1,8}$ | $W^{(1)}_{i_1,16}$ | $W^{(1)}_{i_1,24}$ | $W^{(1)}_{i_1+8,2}$ | $W^{(1)}_{i_1+8,10}$ | $W^{(1)}_{i_1+8,18}$ | $W^{(1)}_{i_1+8,26}$ |
| | $i_2$ | | | | | | | |
| $i_1$ | 8 | 9 | 10 | 11 | 12 | 13 | 14 | 15 |
| 0-15 | $W^{(1)}_{i_1+16,4}$ | $W^{(1)}_{i_1+16,12}$ | $W^{(1)}_{i_1+16,20}$ | $W^{(1)}_{i_1+16,28}$ | $W^{(1)}_{i_1+24,6}$ | $W^{(1)}_{i_1+24,14}$ | $W^{(1)}_{i_1+24,22}$ | $W^{(1)}_{i_1+24,30}$ | where $W^{(1)}_{m,n} = \dfrac{1}{2}\begin{bmatrix} v'_m \\ \varphi_n v'_m \end{bmatrix}$

TABLE 2

| | $i_2$ | | | | | | | |
|---|---|---|---|---|---|---|---|---|
| $i_1$ | 0 | 1 | 2 | 3 | 4 | 5 | 6 | 7 |
| 0-15 | $W^{(2)}_{i_1,i_1,0}$ | $W^{(2)}_{i_1,i_1,1}$ | $W^{(2)}_{i_1+8,i_1+8,0}$ | $W^{(2)}_{i_1+8,i_1+8,1}$ | $W^{(2)}_{i_1+16,i_1+16,0}$ | $W^{(2)}_{i_1+16,i_1+16,1}$ | $W^{(2)}_{i_1+24,i_1+24,0}$ | $W^{(2)}_{i_1+24,i_1+24,1}$ |
| | $i_2$ | | | | | | | |
| $i_1$ | 8 | 9 | 10 | 11 | 12 | 13 | 14 | 15 |
| 0-15 | $W^{(2)}_{i_1,i_1+8,0}$ | $W^{(2)}_{i_1,i_1+8,1}$ | $W^{(2)}_{i_1+8,i_1+16,0}$ | $W^{(2)}_{i_1+8,i_1+16,1}$ | $W^{(2)}_{i_1,i_1+24,0}$ | $W^{(2)}_{i_1,i_1+24,1}$ | $W^{(2)}_{i_1+8,i_1+24,0}$ | $W^{(2)}_{i_1+8,i_1+24,1}$ | where $W^{(2)}_{m,n',n} = \dfrac{1}{\sqrt{8}}\begin{bmatrix} v'_m & v'_{m'} \\ \varphi_n v'_m & -\varphi_n v'_{m'} \end{bmatrix}$ Since the rank is the same as the number of layers, the number of columns equals the number of layers. For example, suppose the number of transmit antennas is 4, and the number of transmit layers is 2. In this case, a precoding matrix may be formed as a 4×2 matrix. Through the precoding matrix, information transmitted through each layer may be mapped to the corresponding antenna.

Further, a codebook for 3-layer CSI reporting using 4 transmit antennas and a codebook for 4-layer CSI reporting using 4 transmit antennas are defined in the 3GPP TS 36.213 V14.0.0 (2016-09).

Table 3 shows a codebook for 1-layer CSI reporting using 8 transmit antennas, and Table 4 shows a codebook for 2-layer CSI reporting using 8 transmit antennas. In Table 3 and 4, a DFT (Discrete Fourier Transform) matrix weight vector, $v_m$ and a cross polarization phase, $\varphi_n$ may be defined as follows. A DFT matrix weight vector represents the amount of phase change between neighboring antennas, and cross polarization phase represents a phase difference between cross polarization antennas when a transmit antenna is formed to have cross polarization.

$$\varphi_n = e^{j\pi n/2}$$

$$v_m = [1\, e^{j2\pi m/32}\, e^{j4\pi m/32}\, e^{j6\pi m/32}]^T$$

TABLE 3

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |
| | | | | $i_2$ | | | | |
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}} \begin{bmatrix} v_m \\ \varphi_n v_m \end{bmatrix}$

TABLE 4

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |
| | | | | $i_2$ | | | | |
| $i_1$ | 8 | 9 | 10 | 11 | 12 | 13 | 14 | 15 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4} \begin{bmatrix} v_m & v_{m'} \\ \varphi_n v_m & -\varphi_n v_{m'} \end{bmatrix}$ Further, a codebook for 3-layer CSI reporting using 8 transmit antennas to a codebook for 8-layer CSI reporting using 8 transmit antennas are also defined in the 3GPP TS 36.213 V14.0.0 (2016-09).

In What Follows, CL-SM (Closed Loop Spatial Multiplexing) Technique Will be Described.

(1) Step 1: a UE in the CL-SM transmission mode may estimate a channel by using CRS or CSI-RS. The CS-SM transmission mode may be transmission mode 4, transmission mode 6, transmission mode 8, transmission mode 9, or transmission mode 10.

(2) Step 2: the UE may select PMI and RI (Rank Indicator) which exhibit the largest SINR among predefined precoding matrices by using the estimated channel. In other words, PMI selection may be performed according to a codebook predefined between a base station and the UE.

(3) Step 3: the UE may calculate CQI (Channel Quality Indicator) by selecting the largest MCS (Modulation and Coding Scheme) which may be allocated under the selected PMI and RI condition.

(4) Step 4: the UE may report the selected PMI, RI, and CQI to the base station.

(5) Step 5: the base station may select MIMO mode and MCS by using the reported PMI, RI, and CQI; and may allocate a resource (PDSCH) to the UE.

(6) Step 6: the UE may receive the PDSCH after obtaining the allocated PMI, RI and CQI information through a PDCCH.

In the CL-SM scheme, a UE has to search all the available codebooks to find a codebook index with which the maximum throughput may be achieved within a predetermined codebook. For example, in the case of 4 transmit antennas, there may be 256 codebooks for 1-layer. In the case of 8 transmit antennas, there may be 128 codebooks for 1-layer. Calculation of all the possible codebooks over all of the layers available may be a large computational burden on a UE. Therefore, it is necessary to propose a method for reducing computational complexity in the codebook search.

In what follows, a method for a UE to select a codebook index according to one embodiment of the present invention will be described.

Figure 8:
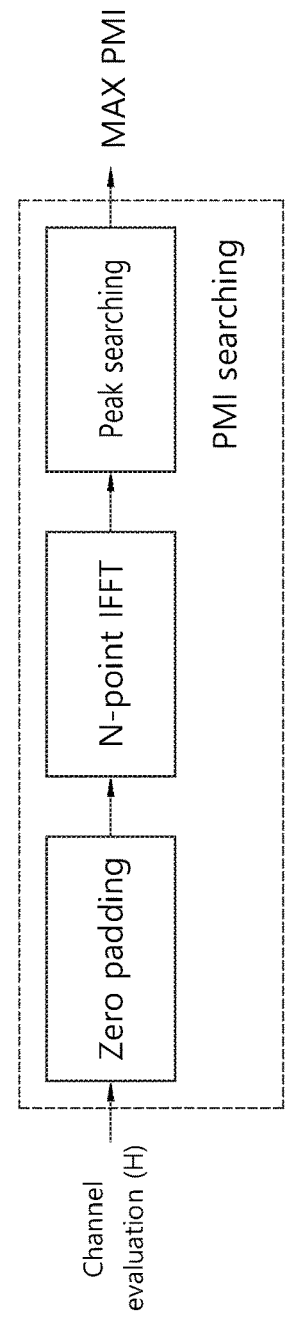
FIG. 8 illustrates a method for detecting PMI in case a cross-polarization antenna is not used.

FIG. 8 illustrates a method for detecting PMI in case a cross-polarization antenna is not used.

With reference to FIG. 8, a UE may measure a channel at S810 step. The channel may be measured by using a reference signal. For example, the reference signal may be a CRS (Common Reference Signal). For example, the reference signal may be a CSI-RS (Channel State Information Reference Signal). The measured channel may be expressed by Eq. 14 below.

$$H_m = [H_{m,1}, H_{m,2}, \ldots, H_{m,n}] \quad \text{[Eq. 14]}$$

The $H_m$ is a channel response measured by the m-th receive antenna, and $H_{m,n}$ is a channel response of the n-th transmit antenna measured by the m-th receive antenna.

In the S820 step, the UE may perform zero padding on the measured channel. The zero padding may be performed N–n times in proportion to the number of parameters N used in the codebook. The N may be 32 in the LTE system. If zero padding is performed for the measured channel, it may be modeled by Eq. 15.

$$\overline{H_m} = [H_m, 0, \ldots, 0] \quad \text{[Eq. 15]}$$

$\overline{H_m}$ represents the result of performing zero padding for the measured channel.

In S830 step, the UE may perform N-point IFFT (Inverse Fast Fourier Transform) for the channel for which zero padding has been performed. N-point IFFT of a channel may be expressed by Eq. 16.

$$\overline{h_m} = \text{IFFT}(\overline{H_m}) \qquad [\text{Eq. 16}]$$

$\overline{h_m}$ represents the result by performing N-point IFFT on the channel for which zero-padding has been performed.

Then, the UE may perform receive antenna combining. The receive antenna combining may imply combining the response obtained for each receive antenna at the S830 step above with a power value. The receive antenna combining may be expressed by Eq. 17.

$$\overline{h} = \sum_{m=0}^{M-1} |\overline{h_m}| \qquad [\text{Eq. 17}]$$

$\overline{h}$ represents the result obtained by performing receive antenna combining for the channel to which N-point IFFT has been performed, and $\overline{h_m}$ represents the result obtained by performing N-point IFFT for the channel to which zero padding has been performed, where, |•| is a notation for a function returning magnitude of the input element.

For example, if there are two receive antennas, $\overline{h_0}$ is [a0, a1, a2, . . . , a31], and $\overline{h_1}$ is [b0, b1, b2, . . . , b31], $\overline{h}$ may be obtained as [|a0|+|b0|, |a1|+|b1|, |a2|+|b2|, . . . , |a31|+|b31|].

In S840 step, the UE may select the maximum power position of the IFFT output signal. In other words, the UE may select an index which returns the largest value from $\overline{h}$. The maximum power position may be expressed by Eq. 18.

$$idx = \arg\max_{k \in \{0,1,\ldots,N-1\}}(\overline{h}) \qquad [\text{Eq. 18}]$$

The idx represents an index corresponding to the maximum power position, and $\overline{h}$ represents the result obtained by performing receive antenna combining for the channel for which N-point IFFT has been performed.

For example, if $\overline{h}$ is [|a0|+|b0|, |a1|b1|, |a2|+|b2|, . . . , |a31|+|b31|], and |a2|+|b2| is the largest value, the selected index is 2. Similarly, if $\overline{h}$ is [|a0|+|b0|, |a1|+|b1|, |a2|+|b2|, . . . , |a31|+|b31|], and |a0|+|b0| is the largest value, the selected index is 0.

In S850 step, the UE may convert the selected maximum power position to a codebook index. In other words, the UE may select a codebook index by using the selected maximum power position. Afterwards, the UE may transmit the converted codebook index to the base station.

Figure 9:
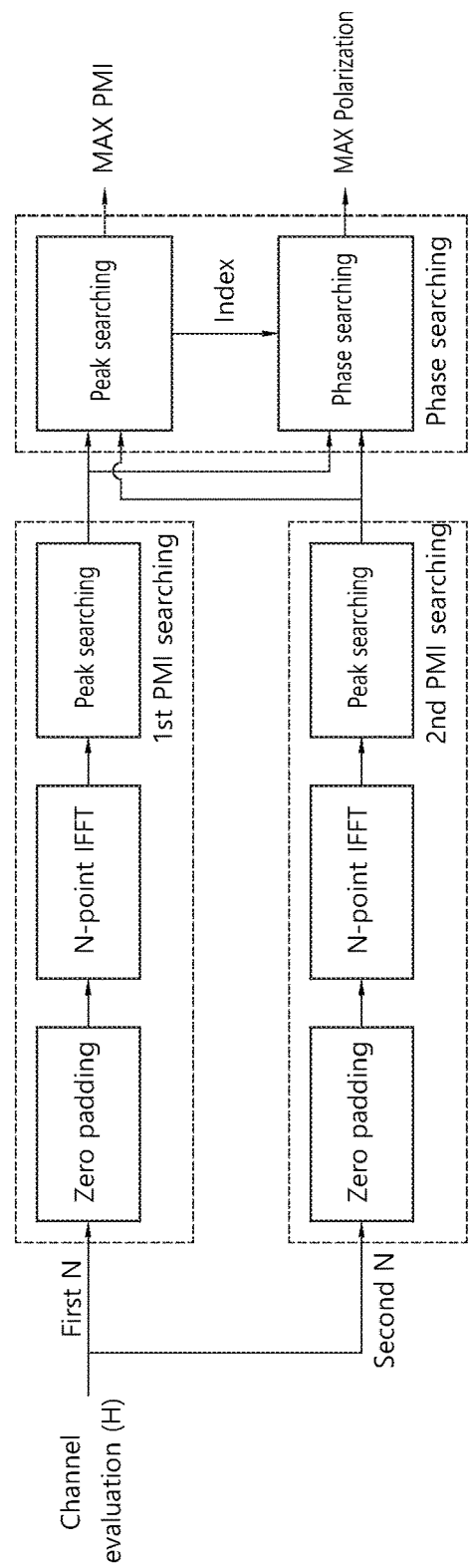
FIG. 9 illustrates a method for detecting PMI in case a cross-polarization antenna is used.

FIG. 9 illustrates a method for detecting PMI in case a cross-polarization antenna is used.

With reference to FIG. 9, a UE may measure a channel at S910 step. The channel may be measured by using a reference signal. For example, the reference signal may be a CRS (Common Reference Signal). For example, the reference signal may be a CSI-RS (Channel State Information Reference Signal). The measured channel may be expressed by Eq. 14 above.

In the S920 step, the UE may perform zero padding on the measured channel. The zero padding may be performed N−n times in proportion to the number of parameters N used in the codebook. The number of first polarization transmit antennas may be n1, and the number of second polarization transmit antennas may be n2. Therefore, N−n1 zeroes may be padded for the first polarization transmit antenna, and N−n2 zeroes may be padded for the second polarization transmit antenna. The N may be 32 in the LTE system. The n1 may correspond to the half of the total number of transmit antennas. The n2 may correspond to the half of the total number of transmit antennas. If zero padding is performed for the measured channel, it may be modeled by Eq. 19.

$$\overline{H_{P1,m}} = [H_{m1}, 0, \ldots, 0]$$

$$\overline{H_{P2,m}} = [H_{m2}, 0, \ldots, 0] \qquad [\text{Eq. 19}]$$

$\overline{H_{P1,m}}$ represents the result of performing zero padding for the first polarization transmit antenna, and $\overline{H_{P2,m}}$ represents the result of performing zero padding for the second polarization transmit antenna. The $H_{m1}$ may include n1 elements, and the $H_{m2}$ may include n2 elements.

In S930 step, the UE may perform N-point IFFT (Inverse Fast Fourier Transform) on the channel for which zero padding has been performed. N-point IFFT of a channel may be expressed by Eq. 20.

$$\overline{h_{P1,m}} = \text{IFFT}(\overline{H_{P1,m}})$$

$$\overline{h_{P2,m}} = \text{IFFT}(\overline{H_{P2,m}}) \qquad [\text{Eq. 20}]$$

$\overline{h_{P1,m}}$ represents the result by performing N-point IFFT for the first polarization transmit antenna, and $\overline{h_{P2,m}}$ represents the result by performing N-point IFFT for the second polarization transmit antenna.

Then, the UE may perform receive antenna combining. The receive antenna combining may imply combining the response obtained for each receive antenna at the S930 step above with a power value. The receive antenna combining may be expressed by Eq. 21.

$$\overline{h_{P1}} = \sum_{m=0}^{M-1} |\overline{h_{P1,m}}| \qquad [\text{Eq. 21}]$$

$$\overline{h_{P2}} = \sum_{m=0}^{M-1} |\overline{h_{P2,m}}|$$

$\overline{h_{P1}}$ represents the result obtained by performing receive antenna combining for the first polarization transmit antenna, and $\overline{h_{P2}}$ represents the result obtained by performing receive antenna combining for the second polarization transmit antenna, where M represents the number of receive antennas, and |•| is a notation for a function returning magnitude of the input element.

For example, if there are two receive antennas, $\overline{h_{P1,0}}$ is [a0, a1, a2, . . . , a31], and $\overline{h_{P1,1}}$ is [b0, b1, b2, . . . , b31], $\overline{h_{P1}}$ may be obtained as [|a0|+|b0|, |a1|+|b1|, |a2|+|b2|, . . . , |a31|+|b31|].

In S940 step, the UE may select the maximum power position of the IFFT output signal. In other words, the UE may select the largest value (namely the first peak value) from the $\overline{h_{P1}}$, select the largest value (namely the second peak value) from the $\overline{h_{P2}}$, and select the index corresponding to the larger of the first and the second peak value. The maximum power position may be expressed by Eq. 22.

$$idx = \arg\max_{k \in \{0,1,\ldots,N-1\}}\{\max(\overline{h_{P1}}), \max(\overline{h_{P2}})\} \qquad [\text{Eq. 22}]$$

The idx represents an index corresponding to the maximum power position, $\overline{h_{P1}}$ represents the result obtained by performing receive antenna combining for the first polarization transmit antenna, and $\overline{h_{P2}}$ represents the result obtained by performing receive antenna combining for the second polarization transmit antenna.

For example, suppose $\overline{h_{P1}}$ is [|a0|+|b0|, |a1|+|b1|, |a2|+|b2|, . . . , |a31|+|b31|], and $\overline{h_{P2}}$ is [|c0|+|d0|, |c1|+|d1|, |c2|+|d2|, . . . , |c31|+|d31|]. Further suppose |a1|+|b1| is the largest value of $\overline{h_{P1}}$, |c2|+|d2| is the largest value of $\overline{h_{P2}}$, and |c2|+|d2| is larger than |a1|+|b1|. In this case, a selected index may be 2.

In S950 step, the UE may calculate a phase difference between polarization antennas from the selected index obtained from the S940 step and convert the calculated phase difference to a phase value of a cross polarization antenna. The phase value of the cross polarization antenna may be expressed by Eq. 23.

$$\text{Phase} = \tan^{-1}\left(\frac{\overline{h}_{P_1,idx}}{\overline{h}_{P_2,idx}}\right) \quad [\text{Eq. 23}]$$

$\overline{h}_{P1,idx}$ is the value corresponding to idx from the result of performing N-point IFFT for the first polarization transmit antenna, $\overline{h}_{P2,idx}$ is the value corresponding to idx from the result of performing N-point IFFT for the second polarization transmit antenna, and the Phase is a phase value of the cross polarization antenna.

In S960 step, the UE may select a codebook index by using at least one of the selected idx or phase value of the cross polarization antenna. Afterwards, the UE may transmit the selected codebook index to the base station. In what follows, a method for selecting a codebook index will be described.

(1) The Case in which 4tx Alternative Codebook is Used

1) Determination of $i_2$

The UE may select $\overline{n}$ as the phase value of the cross polarization antenna, which is the nearest value to $$\frac{2\pi}{32}n.$$

$\overline{n} \in \{0, 2, 4, 6, \ldots, 30\}$. For example, if phase of the cross polarization antenna is $\pi$, n is 16, and the nearest value $\overline{n}$ is 16. The $\overline{n}$ is selected from an array of {0, 8, 16, 24, 2, 10, 18, 26, 4, 12, 20, 28, 6, 14, 22, 30}, and the selected index may be $i_2$. For example, if $\overline{n}$ is 16, $i_2$ is 2.

2) Determination of $i_1$ $i_1$ May be Determined by Eq. 24.

$$i_1 = \text{mod}(idx - \text{offset}, 32) \quad [\text{Eq. 24}]$$

The idx represents an index corresponding to the maximum power position.

If $i_2$ range from 0 to 3, the offset may be 0. If $i_2$ ranges from 4 to 7, the offset may be 8. If $i_2$ ranges from 8 to 11, the offset may be 16. If $i_2$ ranges from 12 to 16, the offset may be 24.

The UE may select a DFT matrix from Table 1 above by using the determined $i_1$ and $i_2$.

(2) The Case in which 8tx Alternative Codebook is Used.

The UE may search for a value $\overline{n}$ which is a phase value nearest to $\pi/2n$ for the cross polarization antenna. $\overline{n} \in \{0, 1, 2, 3\}$. For example, if the phase value of the cross polarization antenna is $\pi$, n is 2, and the nearest value $\overline{n}$ is 2.

1) If the idx is an even number, $i_1$ is determined as idx/2, and $i_2$ is determined as $\overline{n}$. If the idx is an odd number, $i_1$ is determined as (idx−1)/2, and $i_2$ is determined as $\overline{n}+4$.

2) In case $i_1$ is fixed, $i_2$ may be selected from among $\overline{n}$, $\overline{n}+4$, $\overline{n}+8$, $\overline{n}+12$ according to the idx.

The UE may select a DFT matrix from Table 3 above by using the determined $i_1$ and $i_2$.

According to the technical principles of the present invention, in case a codebook design is based on a DFT precoding matrix, the UE may measure the PMI easily by utilizing DFT characteristics. Therefore, in the CL-SM, computational complexity due to PMI search may be reduced. Also, in case a codebook is generated with respect to a cross polarization antenna, the UE may search for a cross polarization phase. The UE doesn't necessarily have to search all of the codebooks but may detect the index of a codebook and phase of a polarization antenna only through two DFT computations. Therefore, computational complexity may be greatly reduced during detection of a codebook.

Figure 10:
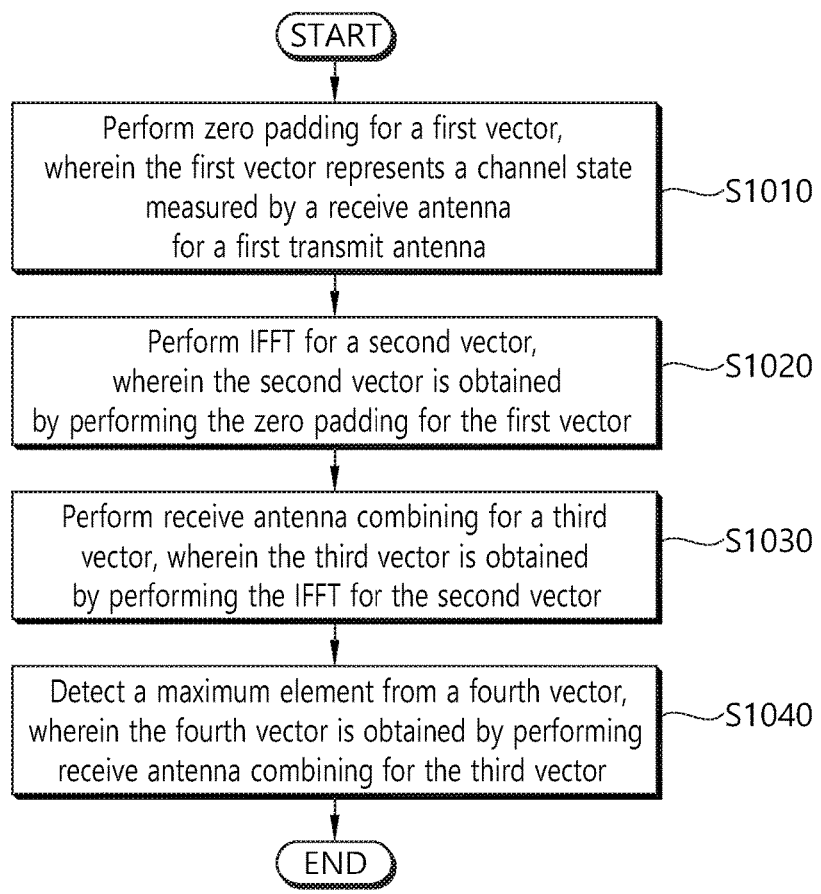
FIG. 10 is a block diagram illustrating a method for a user equipment to select a codebook index.

FIG. 10 is a block diagram illustrating a method for a UE to select a codebook index.

With reference to FIG. 10, in S1010 step, the UE performs zero padding for a first vector, wherein the first vector may represent the state of a channel measured by a receive antenna for a first transmit antenna.

In S1020 step, the UE may perform IFFT for a second vector, wherein the second vector may represent a vector to which zero padding has been performed for the first vector.

In S1030 step, the UE may perform receive antenna combining for a third vector, wherein the third vector is obtained by performing IFFT for the second vector. The receive antenna combining calculates the sum of magnitudes of one or more elements of the third vector.

In S1040 step, the UE may detect the maximum element of a fourth vector, wherein the fourth vector is obtained by performing receive antenna combining for the third vector.

The UE may select the codebook index by using the index of the detected maximum element.

The UE may perform the zero padding for a fifth vector, wherein the fifth vector may represent the state of a channel measured by the receive antenna for a second transmit antenna. And the UE may perform IFFT for a sixth vector, wherein the sixth vector is obtained by performing zero padding for the fifth vector. And the UE may perform the receive antenna combining for a seventh vector, wherein the seventh vector is obtained by performing IFFT for the sixth vector. And the UE may detect the maximum element of an eighth vector, wherein the eighth vector is obtained by performing receive antenna combining for the seventh vector.

The first and the second transmit antenna may be cross polarization antennas.

The UE may compare the maximum element detected from the fourth vector with the maximum element detected from the eighth vector. The UE may select an index of the larger of the maximum element detected from the fourth vector and the maximum element detected from the eighth vector. The UE may calculate a phase between elements of the third vector corresponding to the selected index and elements of the seventh vector. The UE may select the codebook index on the basis of the calculated phase.

Figure 11:
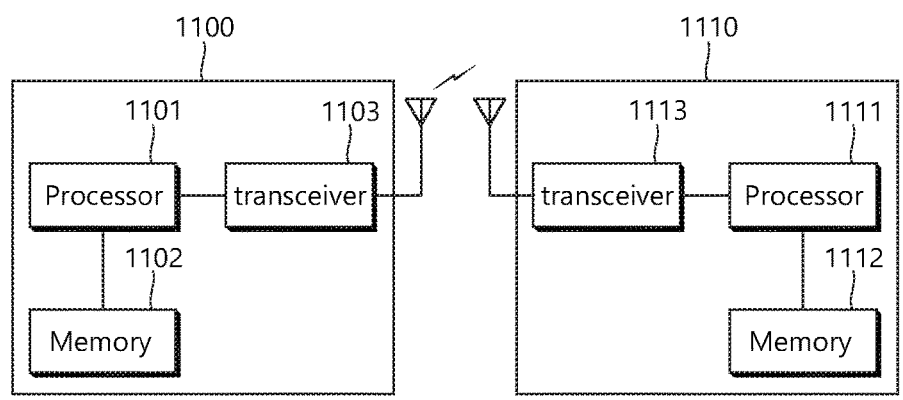
FIG. 11 is a block diagram illustrating a wireless communication system according to the embodiment of the present invention.

FIG. 11 is a block diagram illustrating a wireless communication system according to the embodiment of the present invention.

A BS 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the base station may be implemented by the processor 1101.

A UE 1110 includes a processor 1111, a memory 1112 and a transceiver 1113. The memory 1112 is connected to the processor 1111, and stores various information for driving the processor 1111. The transceiver 1113 is connected to the processor 1111, and transmits and/or receives radio signals. The processor 1111 implements proposed functions, processes and/or methods. In the above embodiment, an operation of the base station may be implemented by the processor 1111.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for selecting, by a user equipment (UE), a codebook index in a wireless communication system, comprising:
    generating a second vector by performing zero padding for a first vector,
        wherein the first vector represents a channel state measured by a receive antenna for a first transmit antenna;
    generating a third vector by performing an Inverse Fast Fourier Transform (IFFT) for the second vector;
    generating a fourth vector by performing receive antenna combining for the third vector;
    detecting a maximum element of the fourth vector;
    selecting the codebook index, based on an index of the detected maximum element; and
    transmitting the selected codebook index to a base station.

2. The method of claim 1, wherein the receive antenna combining corresponds to calculating the sum of magnitudes of one or more of the elements of the third vector.

3. The method of claim 1, further comprising
    generating a sixth vector by performing the zero padding for a fifth vector, wherein the fifth vector represents the channel state measured by the receive antenna for a second transmit antenna;
    generating a seventh vector by performing the IFFT for the sixth vector;
    generating a eighth vector by performing receive antenna combining for the seventh vector; and
    detecting a maximum element of the eighth vector.

4. The method of claim 3, wherein the first transmit antenna and the second transmit antenna are cross-polarization antennas.

5. The method of claim 4, further comprising:
    comparing the detected maximum element of the fourth vector with the detected maximum element of the eighth vector.

6. The method of claim 5, further comprising:
    selecting an index of a maximum element among the detected maximum element of the fourth vector and the detected maximum element of the eighth vector.

7. The method of claim 6, further comprising:
    calculating a phase between elements of the seventh vector and elements of the third vector corresponding to the selected index.

8. The method of claim 7, further comprising:
    selecting the codebook index based on of the calculated phase.

9. A UE for selecting a codebook index in a wireless communication system, comprising:
    a memory;
    a transceiver; and
    a processor, connected with the memory and the transceiver, that:
        generates a second vector by performing zero padding for a first vector,
            wherein the first vector represents a channel state measured by a receive antenna for a first transmit antenna;
        generates a third vector by performing Inverse Fast Fourier Transform (IFFT) for the second vector;
        generates a fourth vector by performing receive antenna combining for the third vector:
        detects a maximum element from the fourth vector;
        selects the codebook index, based on an index of the detected maximum element; and
        controls the transceiver to transmit the selected codebook index to a base station.

10. The UE of claim 9, wherein the receive antenna combining corresponds to calculating the sum of magnitudes of one or more of the elements of the third vector.

11. The UE of claim 9, wherein the processor is a processor that:
    generates a sixth vector by performing the zero padding for a fifth vector,
        wherein the fifth vector represents a channel state measured by the receive antenna for a second transmit antenna;
    generates a seventh vector by performing the IFFT for the sixth vector; and
    generates a eighth vector by performing receive antenna combining for the seventh vector.

12. The UE of claim 11, wherein the processor is a processor that selects an index of a maximum element among the detected maximum element of the fourth vector and the detected maximum element of the eighth vector.

13. The UE of claim 12, wherein the processor a processor that calculates a phase between elements of the seventh vector and elements of the third vector corresponding to the selected index.

* * * * *